United States Patent
Cornes et al.

(10) Patent No.: US 6,222,849 B1
(45) Date of Patent: *Apr. 24, 2001

(54) DESIGNATING A CONTROL CHANNEL IN A TELECOMMUNICATIONS SYSTEM

(75) Inventors: Martin P. J. Cornes, Plano; Glenn Anthony Giordano, Allen; Christopher James Koath, Plano, all of TX (US)

(73) Assignee: Alcatel USA Sourcing L.P., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/347,173

(22) Filed: Jul. 2, 1999

Related U.S. Application Data

(63) Continuation of application No. 08/996,693, filed on Dec. 23, 1997, now Pat. No. 5,956,343.

(51) Int. Cl.[7] ............................................. H04J 3/16
(52) U.S. Cl. .................... 370/437; 370/228; 370/439; 370/449; 370/462; 370/465; 370/522; 379/230
(58) Field of Search .................................. 370/225, 222, 370/228, 270, 248, 249, 437–439, 442, 443, 447, 449, 450, 453, 457, 459, 462, 465, 468, 485, 496, 522, 524; 379/230, 231, 232, 234; 455/509, 511, 450, 452; 340/825.03

(56) References Cited

U.S. PATENT DOCUMENTS

| | | | |
|---|---|---|---|
| 4,993,014 | * 2/1991 | Gordon | 370/225 |
| 5,528,665 | 6/1996 | Peitz | 370/329 |
| 5,751,717 | * 5/1998 | Babu et al. | 370/466 |
| 5,778,318 | * 7/1998 | Talarmo et al. | 370/341 |
| 5,818,825 | 10/1998 | Corrigan et al. | 370/329 |
| 5,822,420 | * 10/1998 | Bolon et al. | 370/434 |
| 5,956,343 | * 9/1999 | Cornes et al. | 370/437 |
| 6,031,906 | * 2/2000 | Rao | 379/273 |

OTHER PUBLICATIONS

Bellcore, Technical Reference TR–TSY–00008, "Digital Interface Between the SLC96 Digital Loop Carrier System And A Local Digital Switch", Issue 2, Aug. 1987.

Belicore, Technical Reference TR–NWT–000303, "IDLC System Generic Requirements, Objectives, and Interface: Feature Set C–SONET Interface", Issue 2, Dec. 1992, Supplement 1, Dec. 1993.

Bellcore, Technical Reference TR–NWT–000303, "Integrated Digital Loop Carrier System Generic Requirements, Objectives, and Interface", Issue 2, Dec. 1992, Revision 1, Dec. 1993.

ITU International Telecommunication Union, *Digital Sections and Digital Line Systems*, "V–Interfaces at the Digital Local Exch. (LE)–V5.2 Interface (Based on 2048 kbit/s) For The Support of Access Network (AN)" 3/95.

Bellcore, Technical Reference TR–TSY–000303, "IDLC System Generic Requirements, Objectives, and Interface: Operations (ROS/CMIs/ASN.1) Messages Release 1.0", Issue 1, Mar. 1990, Supplement 3.

* cited by examiner

Primary Examiner—Seema S. Rao
(74) Attorney, Agent, or Firm—Fish & Richardson P.C.

(57) ABSTRACT

A method of providing a control channel between first and second access terminals in a digital loop carrier, includes forming a pool of channels coupling the first and second terminals wherein each member of the pool can be assigned either to serve as the control channel or as a data channel. A member of the pool is dynamically assigned as the control channel. The control channel can be used to convey information regarding assignment of data channels to handle an incoming or outgoing call.

12 Claims, 5 Drawing Sheets

DESIGNATING A CONTROL CHANNEL IN A TELECOMMUNICATIONS SYSTEM

CROSS REFERENCE TO RELATED APPLICATIONS

This application is a continuation of U.S. Ser. No. 08/996,693, filed Dec. 23, 1997, now U.S. Pat. No. 5,956,343.

BACKGROUND

The present invention relates generally to designating a control channel in a telecommunications system.

Telecommunications terminals connect subscriber lines, such as POTS (Plain Old Telephone Service) lines, ISDN (Integrated Services Digital Network) lines, E1 (Electronic Interface Level 1) lines, and optics lines to telecommunications exchanges and other telecommunications equipment. A terminal contains channel unit card slots that accept channel unit cards. The channel unit cards, or line cards, convert analog or digital signals from subscriber lines into formatted digital data signals. Different types of channel unit cards service different types of subscriber lines.

A terminal constructs a single time division multiplexed (TDM) signal from several channel unit cards' formatted digital data signals for transmission to remote telecommunications equipment. The terminal also demultiplexes TDM signals received from remote telecommunications equipment to deliver formatted digital data back to the channel unit cards. Channel unit cards convert the formatted digital data into a form suitable for transmission over subscriber lines.

Two telecommunications terminals can be connected "back to back" to form a digital carrier loop network. A digital carrier loop network typically includes a remote terminal placed near a business or residence and a central terminal placed in a central exchange connected to a telecommunications switch. The remote terminal and central terminal communicate over one or more lines carrying TDM signals. This configuration connects subscribers to the telecommunications switch.

SUMMARY

In general, in one aspect, a method of providing a control channel between first and second access terminals in a digital loop carrier, includes forming a pool of channels which couple the first and second terminals, wherein each member of the pool can be assigned either to serve as the control channel or as a data channel. A member of the pool is dynamically assigned as the control channel. The control channel can be used to convey information regarding assignment of data channels to handle an incoming or outgoing call.

In another aspect, a digital loop carrier includes terminals configured and programmed to assign a control channel dynamically from among a pool of channels.

Various implementation can include one or more of the following features. A first signal pattern can be broadcast from the first terminal to the second terminal over at least a subset of the pool members. A second signal pattern can be transmitted from the second terminal to the first terminal over a pool member on which the first signal pattern was broadcast and received. A third signal pattern can be transmitted from the first terminal to the second terminal using the pool member over which the second signal pattern was transmitted and received. The pool member, over which the second and third signal patterns were transmitted and received, can then be assigned as the control channel. The first, second and third signal patterns can include, for example, predetermined asynchronous patterns.

In some implementations, the first and second terminals are central office and remote terminals of a digital loop carrier. The pool of channels can consist of non-dedicated channels. A pool member can be assigned dynamically as the control channel in response to detection of a failure of a previously assigned control channel.

The first signal pattern can be broadcast repeatedly from the first terminal to the second terminal. Similarly, the second signal pattern can be repeatedly transmitted from the second terminal to the first terminal using the pool member on which the first signal was received by the second terminal.

The first and second terminals can include respective databases storing status information for the pool members. Thus, in some implementations, the first signal pattern can be broadcast only over those pool members whose status information indicates that they currently are not handling a call on a subscriber line, do not have an alarm associated with them, and are in service.

The second terminal can poll at least a subset of the pool members for receipt of the first signal pattern. Similarly, the first terminal can poll at least a subset of the pool members for receipt of the second signal pattern. In various implementations, the terminals poll only pool members whose status information indicates that they currently are not handling a call on a subscriber line, do not have an alarm associated with them, and are in service.

The second terminal can calculate an expected response time within which it expects to receive a third signal pattern from the first terminal on the same poll member over which the second signal pattern was transmitted. The expected response time can be calculated by multiplying the number of pool members by a predetermined average time. If the third signal pattern is not received within the expected response time, a status indicator for the pool member over which the second signal pattern was transmitted can be marked as currently unavailable.

In addition, the transmission medium can comprise, for example, one or more metallic conductors, optical fibers, wireless media or a combination thereof. Similarly, the pool of channels can be formed from among channels in the conductors, the optical fibers, wireless channels, or a combination thereof. A single channel can serve as the control channel for all the available data channels connecting the two terminals.

In some implementations, subscriber signaling information also can be communicated over the control channel.

Various implementations may provide one or more of the following advantages. By dynamically allocating the control channel from among a pool of available channels, the system provides greater flexibility in the event of the failure of a control channel or the failure of an entire facility carrying the control channel. Moreover, the technique described herein obviates the need for reserving a particular channel as a back-up control channel. A new control channel is assigned if and when it is required. Thus, a greater number of channels can be used for carrying subscriber data.

Additional features and advantages will be readily apparent from the following description, drawings and claims.

DETAILED DESCRIPTION

Figure 1:
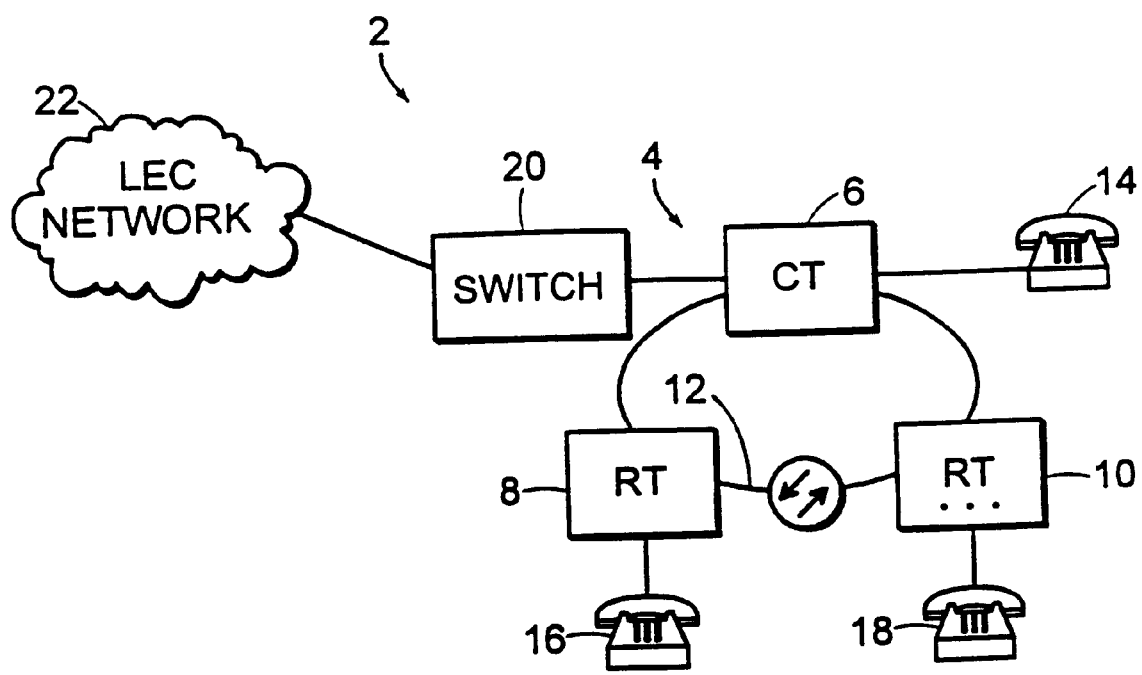
FIG. 1 is a block diagram of a telecommunications system.

As shown in FIG. 1, a telecommunications system 2 includes a digital loop carrier (DLC) 4. The digital loop carrier 4 includes a central office terminal (CT) 6 coupled to one or more remote terminals (RT) 8, 10 via metallic, fiber or other suitable communication media 12. The digital loop carrier 4 acts as a delivery unit of the system 2 and delivers call control and management signals. Subscriber devices, such as telephone service equipment 14, 16, 18, can be coupled to the central office terminal 6 or to the remote terminals 8, 10, respectively. The central office terminal 6 also is coupled to a local exchange carrier (LEC) network 22. The central office terminal 6 may be coupled to the LEC network 22 through a switch 20, such as a class 5 switch.

Figure 2:
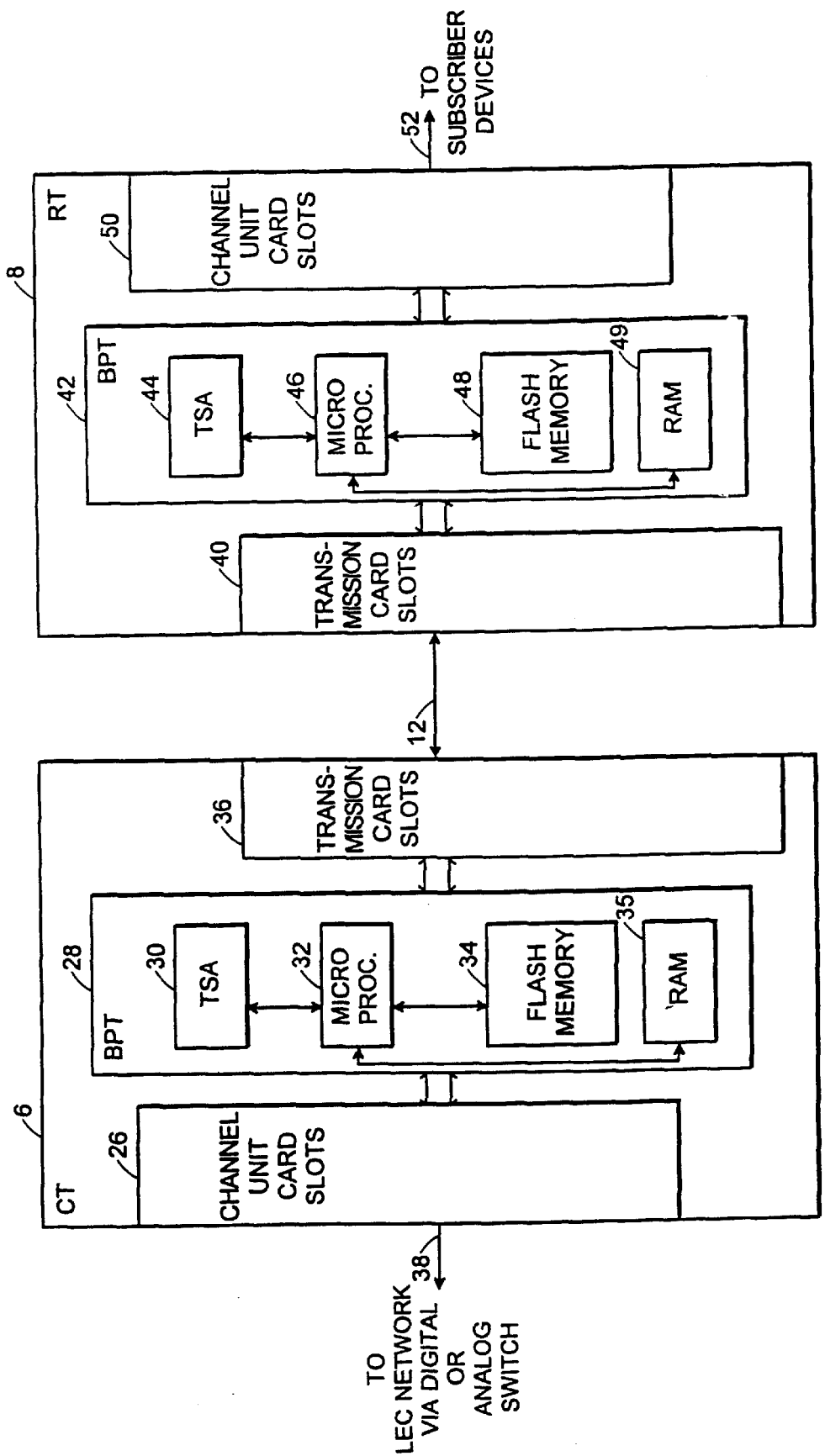
FIG. 2 is a block diagram of a digital loop carrier.

As shown in FIG. 2, the central office terminal 6 and the remote terminals, such as terminal 8, have one or more channel unit receptors, such as slots 26, 50, respectively. The slots 50, 26 accommodate channel unit cards which carry data signals to and from subscriber lines 52 and LEC network lines 38, respectively. The subscriber lines 52 are coupled to subscriber devices, such as the telephone 16, and the LEC network lines 38 are coupled to the LEC network 22, for example, through the switch 20. Channel unit cards in the slots 50 convert incoming subscriber line data signals into formatted digital data and convert formatted digital data into data signals suitable for transmission over the subscriber lines 52. Similarly, channel unit cards in the slots 26 convert incoming LEC network line data signals into formatted digital data and convert formatted digital data into data signals suitable for transmission over the LEC network lines 38.

Different channel unit cards serve different kinds of narrowband (e.g., POTS, COIN, UVG/EWG, Four-Wire E&M, Universal Four-Wire, Basic Rate Interface Unit) and wideband (ISDN, DS1U, T1U, ADS1U, AT1U, E1, E1 Short Haul, E1 Long Haul and E1Conc) subscriber lines.

Each of the central office terminal 6 and the remote terminal 8 also includes one or more receptors, such as slots 36, 40, to accommodate transmission cards. Transmission cards in the slots 36, 40 enable the terminals 6, 8 to communicate over the communication media 12. Different transmission cards support different communication media. For example, E1 cards or T1/HSDL cards can be used to support communications over metallic media, and optical line unit cards can be used for fiber optic communications. Other line cards can be used for transmission over wireless media. The transmission cards in the slots 36, 40 handle the conversion between the communication medium 12 signals and the electric signals the terminals 6, 8 can understand and process.

The central office terminal 6 and the remote terminal 8 each includes at least one Bandwidth Allocator, Processor and Timing Unit (BPT) card 28, 42. Each BPT card 28, 42 collects formatted digital signals from its respective channel unit cards in the slots 26 or 50 and multiplexes them, for example, into a TDM signal. The multiplexed signal then can be sent over the transmission medium 12 via the transmission cards in the slots 36 or 40, respectively. The BPT cards 28, 42 also receive TDM signals from their respective transmission cards. The BPT cards 28, 42 demultiplex the received TDM signals and route them for delivery to their respective channel unit cards in slots 26, 50.

Each BPT card includes a time slot assignor, a microprocessor, flash memory, such as electrically erasable programmable read only memory (EEPROM), and random access memory (RAM). For example, the BPT card 28 in the central office terminal 6 includes a time slot assignor (TSA) 30, a microprocessor 32, flash memory 34 and RAM 35. Similarly, the BPT card 42 in the remote terminal 8 includes a time slot assignor (TSA) 44, a microprocessor 46, flash memory 48 and RAM 49. Each BPT card 28, 42 also includes other components which are further described, for example, in a U.S. patent application Ser. No. 08/970,183, entitled "Telecommunications Terminal" and filed on Nov. 14, 1997, now pending which is assigned to the assignee of the present invention and which is incorporated herein by reference in its entirety.

Each TSA, such as the time slot assignor 44, demultiplexes signals received from its respective channel unit cards. The time slot assignor 44 sends the demultiplexed signals to the microprocessor 46 which packages the demultiplexed signals into a single TDM signals. The microprocessor 46 sends the TDM signal to an associated transmission card in the slots 40 for transmission to the central office terminal 6. The microprocessor 46 and time slot assignor 44 perform the reverse operations on incoming TDM signals. The microprocessor 32 and time slot assignor (TSA) 30 perform analogous functions in the central office terminal 6.

Figure 3:
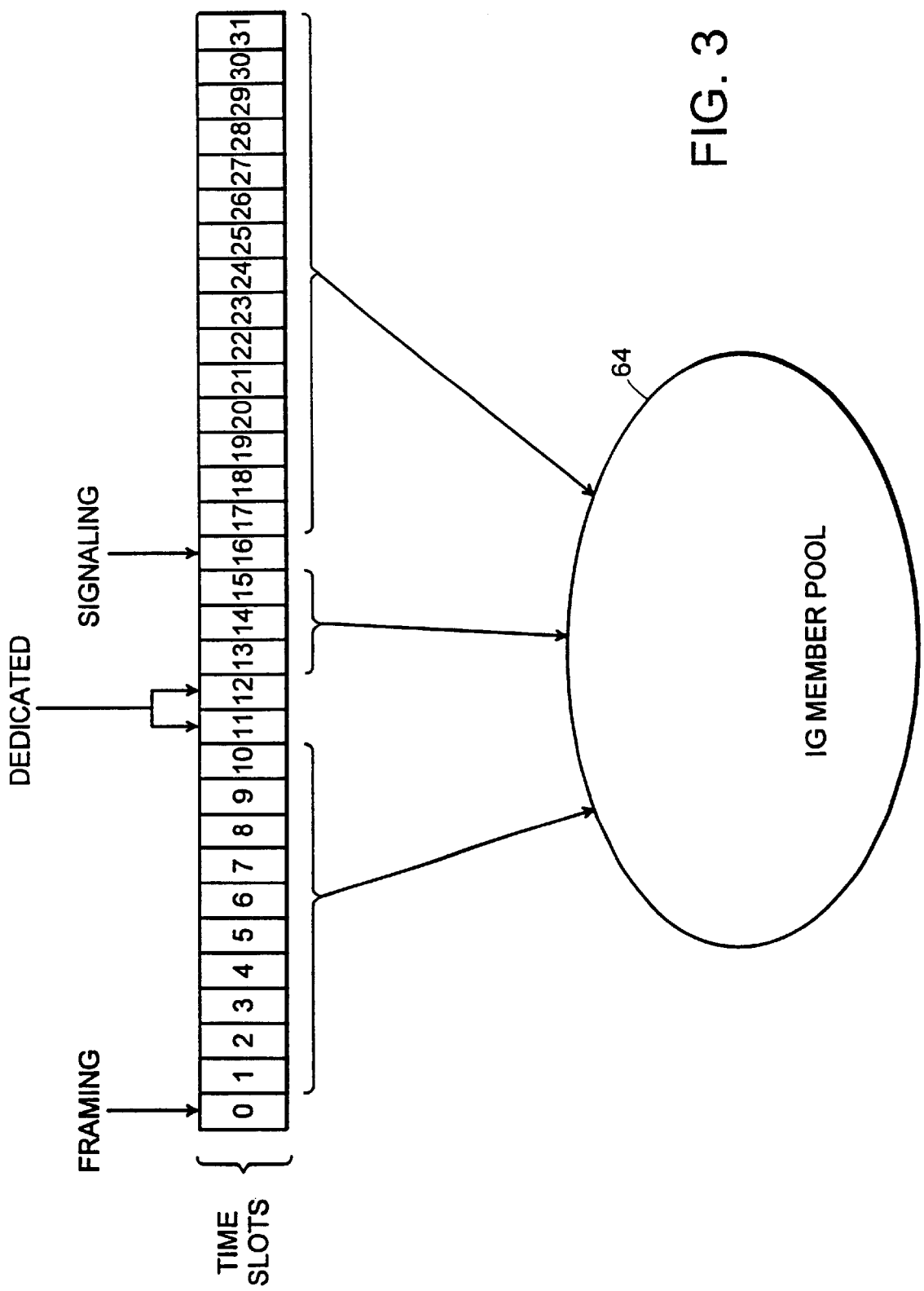
FIG. 3 shows an exemplary pool of interface group (IG) members.

For purposes of illustration, it is assumed that each of the terminals 6, 8 includes one E1 card in their respective transmission card slots 36, 40. The E1 format can be used, for example, with TDM techniques based on the International Telecommunication Union CCITT's G.700 Series Recommendations. As shown in FIG. 3, the El format is a 32-channel format in which each channel, or time slot, corresponds to a 64 kilobit per second (Kb/s), or DS0, signal. Two of the channels, for example, channels 0 and 16, are reserved for framing and signaling. respectively.

One of the thirty remaining channels is designated as a control channel to allow the BPT cards 28, 42 to communicate information regarding allocation of a channel for a particular incoming or outgoing call. Thus, up to 29 channels or time slots remain for use as data channels. The BPT card 28 in the central office terminal 6 dynamically allocates available channels or time slots among the subscriber and LEC network lines on a per-call basis. One suitable technique for dynamically allocating the available channels is described, for example, in a U.S. patent application Ser. No. 08/996,686, now pending, entitled "Routing Telecommunications Traffic" and filed concurrently with the present application, and which is incorporated herein by reference in its entirety. The control channel also can be used by the terminals 6, 8 to communicate information regarding the status of the other data channels. In some implementations, subscriber signaling information also can be communicated over the control channel rather than the separate channel 16.

Figure 4:
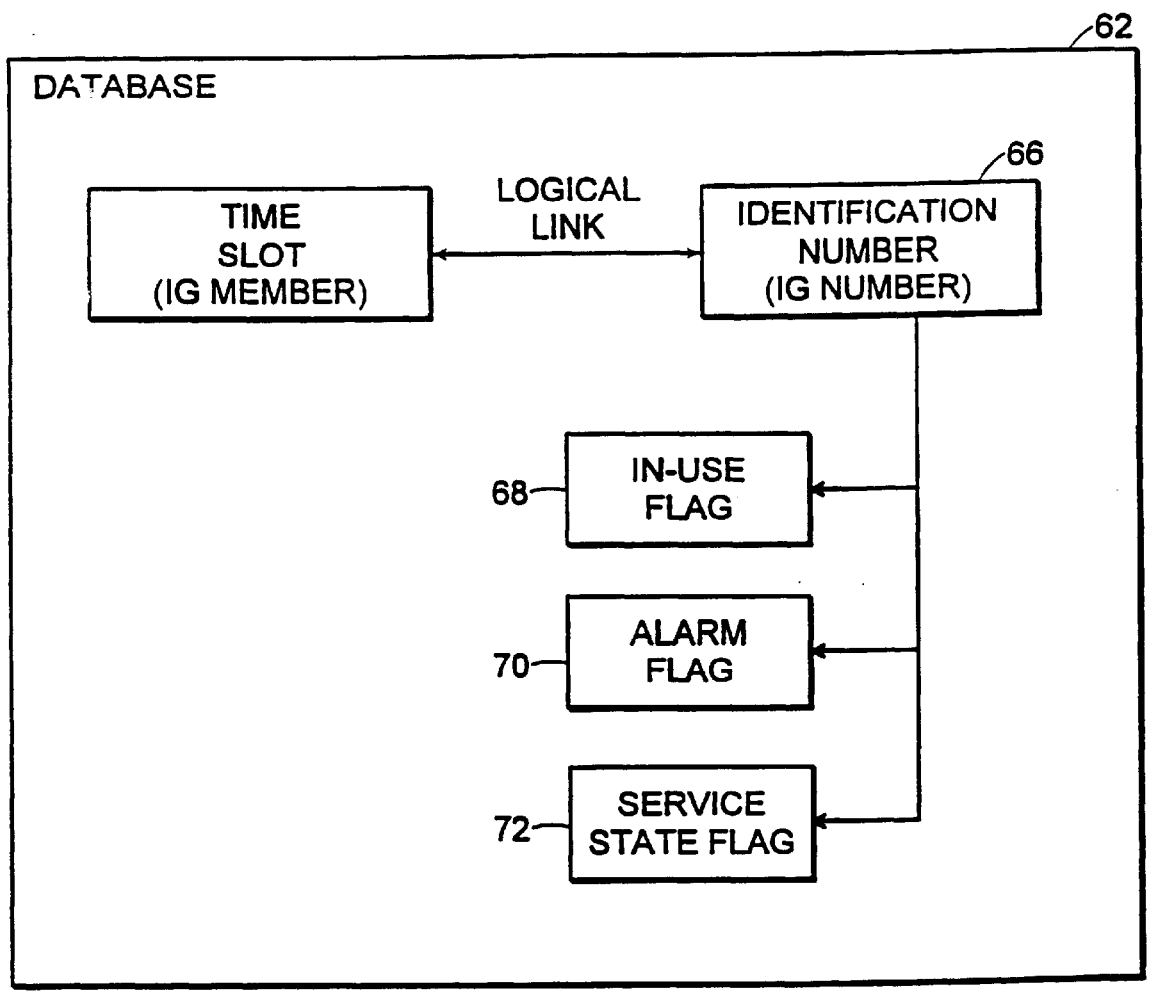
FIG. 4 illustrates a database associated with access terminals.
Figure 5:
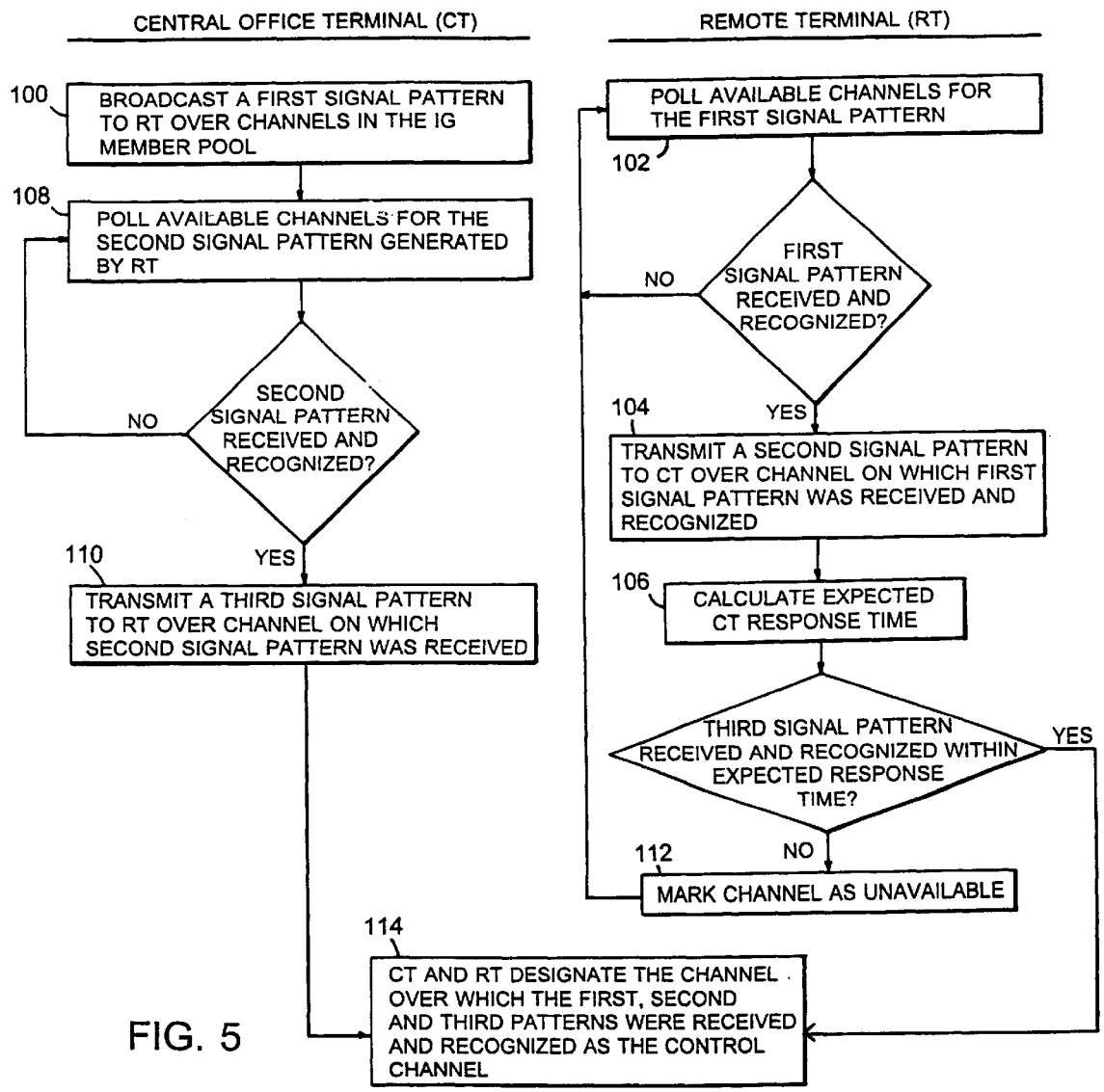
FIG. 5 is a flow chart showing steps of a method for designating a control channel.

Each of the flash memories 34, 48 in the respective BPT cards 28, 42 stores information, for example, in a database or table, such as the database 62 (FIG. 4). The database 62 contains information about the time slots that are available to serve either as the control channel or to be allocated to handle a call on a subscriber line. Each time slot which is potentially available to serve as the control channel or to be allocated to handle a call is assigned an identification number. The available time slots can be referred to as interface group members (IG members) each of which is assigned an interface group number (IG number) 66. The identity of the IG members and their corresponding IG numbers are stored in the database 62 in each flash memory 34, 48 on the BPT cards 28, 42. Thus, as shown in FIG. 3, the potentially available time slots or channels form a pool 64 of IG members.

In certain implementations, one or more of the data time slots may be dedicated to a specific subscriber line. Such a dedicated time slot is not an IG member and is, therefore, not assigned an IG number. An administrator at a user interface terminal (not shown) can instruct the terminals 6, 8 to change the status of a time slot from dedicated to non-dedicated or vice-versa using, for example, the Bellcore Transaction Language 1 (TL1). In any event, at any given time during the operation of the digital loop carrier, only those time slots which are not dedicated to a particular subscriber line or LEC network line are considered IG pool members. For example, as shown in FIG. 3, time slots 11 and 12 are shown as dedicated time slots and, therefore, are not part of the IG member pool.

Although FIG. 3 shows time slots or channels associated with a single E1 card, the disclosed technique for designating a control channel can be used in a system in which the channels in the IG member pool are associated with multiple transmission cards at the central office and remote terminals 6, 8. For example, instead of a single E1 card or optical line unit card in each of the transmission cards slots 36, 40, multiple E1 cards or optical unit line cards can serve as the interface between the transmission medium 12 and each of the BPT cards 6, 8, respectively. A single channel still can serve as the control channel for all the data channels that form the pool of IG members 64.

The database 62 also stores status information about each IG member. Specifically, each IG member has an in-use flag 68, an alarm flag 70 and a service state flag 72 associated with that IG member. The in-use flag indicates whether the IG member is currently assigned to handle a call involving one of the subscriber or LEC network lines. The alarm flag indicates whether any specified alarms, such as faults, currently are associated with the IG member. The service state flag indicates whether the IG member has been taken out of service, for example, to allow maintenance-related tasks to be performed.

Although both the remote terminal 8 and the central office terminal 8 have a database 62, the stored information regarding the current status of a particular IG member may differ. For example, the database in the remote terminal 8 may indicate that a particular channel has an alarm associated with it, while the database in the central office terminal 6 may indicate that there are no alarms associated with that same channel. Furthermore, additional or different status information, such as the detection of errors on the channels, can also be stored.

FIG. 6 is a flow chart showing a method of designating a control channel, for example, when the digital loop carrier system 4 is initialized or following the failure of a previously designated control channel. A previously designated control channel may become unusable due to one of several reasons, including equipment failure, power failure, or damage to the facility comprising the control channel. In general, a channel from among the IG pool members is allocated as the new control channel through an exchange of predetermined signals between the central office terminal 6 and the remote terminal 8, as described in greater detail below.

As indicated by step 100 (FIG. 6), when a new control channel must be designated, the central office terminal 6 repeatedly broadcasts a first signal pattern to the remote terminal 8 over at least a subset of the channels currently in the IG member pool 64. The first signal pattern is a predetermined pattern, which can be stored, for example, in the flash memories 34, 48 of the BPT cards 28, 42. In one implementation, the first signal pattern is an asynchronous bit or byte pattern, such as an 8-bit word. Alternative patterns also can be used.

The subset of IG members over which the first signal pattern is broadcast includes those channels which, based on the status information stored in the database 62, are potentially available to serve as the control channel. Thus, for example, the first signal pattern is not broadcast over a channel which currently is handling a call, which has an alarm associated with it, or which has been taken out of service.

As indicated by step 102, when a new control channel must be designated, the remote terminal 8 polls or scans channels in the IG pool for the first signal pattern. The remote terminal 8 polls the channels one at a time, for example, in numerical order according to IG numbers, until the remote terminal receives and recognizes the first signal pattern. In some implementations, the terminal 8 polls only a subset of the channels in the IG pool, as described further below. Once the remote terminal 8 receives and recognizes the first signal pattern, then, as indicated by step 104, the remote terminal repeatedly transmits a second signal pattern to the central office terminal 6 using the same channel on which the first signal pattern was received and recognized. The second signal pattern is another predetermined pattern, which also can be an asynchronous bit or byte pattern that is stored in the flash memories 34, 48. Alternative patterns also can be used.

When the remote terminal 8 transmits the second signal pattern, it also calculates an expected response time, as shown by step 106. The expected response time represents a time within which the remote terminal 8 expects to receive an acknowledgment, or third signal pattern, from the central office terminal 6. In one implementation, the expected response time is calculated by multiplying a fixed average polling period by the total number of IG members in the pool 64. The average polling period, which represents an average time required for the central office terminal 6 to scan or poll a channel for receipt of the second signal pattern and to send a response, can be stored in the flash memory 48. In the latter implementation, the expected response time represents an upper limit on the period within which the remote terminal 8 would expect to receive a response from the central office terminal 6.

After beginning to broadcast the first signal pattern repeatedly in step 100, the central office terminal 6 polls or scans channels in the IG pool for the second signal pattern, as indicated by step 108. The central office terminal 6 continuously polls the channels one at a time, for example, in numerical order according to IG numbers, until the central office terminal receives and recognizes the second signal pattern. In some implementations, the terminal 6 polls only a subset of the channels in the IG pool, as described further below. Once the central office terminal 6 receives and recognizes the second signal pattern, then, as indicated by step 110, the central office terminal transmits a third predetermined signal pattern to the remote terminal 8 using the same channel on which the second signal pattern was received and recognized. The third signal pattern also can be an asynchronous bit or byte pattern that is stored in the flash memories 34, 48. Alternative patterns also can be used.

After sending the second signal pattern in step 104, the remote terminal 8 waits for receipt of the third signal pattern until the expected response time calculated in step 106 elapses. If the third signal pattern is not received and recognized within the expected response time, then the remote terminal 8 marks the channel on which the second signal pattern was sent as currently unavailable for use as the control channel, as indicated by step 112. That situation can occur, for example, where the channel on which the second signal pattern was transmitted currently permits one-way transmissions only. The channel can be marked as currently unavailable for use as the control channel by setting a flag stored, for example, in the flash memory 48. The remote terminal 8 then proceeds to step 102 to continue polling other available channels in the IG pool for receipt of the broadcast first signal pattern.

If, on the other hand, the remote terminal 8 receives and recognizes the third signal pattern within the expected response time, the remote terminal and the central office terminal 6 designate the channel on which the first, second and third signal patterns were received and recognized, as the control channel. The terminals 6, 8 then can communicate on that channel according to a protocol used for the control channel.

To improve the efficiency of the system, the remote terminal 8 and the central office terminal 6 need not poll or scan every channel in the IG pool 64. Rather, each of the terminals 6, 8 can poll a subset of IG members based on status information stored in its respective database 62. Thus, for example, in step 102, the remote terminal 8 can scan only those channels in the IG pool 64 which currently are not handling a call, which do have an alarm associated with them, or which have not been taken out of service. Those IG pool members whose status, as stored by the database 62 associated with the remote terminal 8, indicates that they are currently handling a call, have an alarm associated with them, or have been taken out of service, are skipped unless their status subsequently changes. Of course, in some situations, the subset of IG members may include all IG members, other than an IG member corresponding to a previously failed control channel.

Similarly, in step 108, the central office terminal 6 can scan only those channels in the IG pool 64 which currently are not handling a call, which do have an alarm associated with them, or which have not been taken out of service. Those IG pool members whose status, as stored by the database 62 associated with the remote terminal 6, indicates that they are currently handling a call, have an alarm associated with them, or have been taken out of service, are skipped, thus avoiding scanning those channels unnecessarily.

In the event that during the course of attempting to designate a control channel, all IG members of an appropriate subset have been marked as unavailable by the remote terminal 8 (step 112), then the remote terminal resets the status of the entire subset of IG members and returns to step 102 to continue polling the subset of IG members.

In some implementations, the central office and remote terminals 6, 8 can be coupled by multiple transmission media 12 of different types. For example, the terminals 6, 8 can be coupled by a metallic conductor as well as an optical fiber, with E1 cards and optical line cards serving as the interface between the terminals and the metallic and fiber optic transmission media, respectively. A single channel or time slot can serve as the control channel for all the available data channels even when different types of facilities are used.

Due to the higher bandwidth available through use of a fiber optic transmission medium, multiple remote terminals can be daisy-chained together and their signals transmitted across a single fiber optic transmission medium 12. If multiple remote terminals are coupled to a single central office terminal, a corresponding control channel is assigned for communications with each remote terminal. The technique described above, can be used to assign or re-assign a control channel for each of the remote terminals.

Other implementations are within the scope of the following claims.

What is claimed is:

1. A method of establishing a control channel between first and second terminals, the method comprising:

broadcasting a first signal pattern from the first terminal to the second terminal over at least a subset of members of a pool of channels, each of which can be designated either as a control channel or a data channel in response to a failure of a previously designated control channel;

transmitting a second signal pattern from the second terminal to the first terminal over a pool member on which the first signal pattern was broadcast and received;

transmitting a third signal pattern from the first terminal to the second terminal using the pool member over which the second signal pattern was transmitted and received; and assigning the pool member over which the second and third signal patterns were transmitted and received as the control channel between the first and second terminals.

2. The method of claim 1 wherein each of the first, second and third signal patterns includes a respective predetermined pattern.

3. The method of claim 1 wherein each of the first, second and third signal patterns includes a respective asynchronous pattern.

4. The method of claim 1 wherein the second terminal polls at least a subset of the pool members for receipt of the first signal pattern.

5. The method of claim 1 further including calculating an expected response time within which the second terminal expects to receive the third signal pattern from the first terminal.

6. The method of claim 1 wherein the first terminal polls at least a subset of the pool members for receipt of the second signal pattern.

7. A communications system comprising:

a first terminal;

a second terminal;

a pool of communication channels each of which can be designated either as a data channel to handle an incoming or outgoing communication between the first and second terminals, or to serve as a control channel to convey information regarding assignment of data channels, wherein the first and second terminals are configured to exchange multiple predetermined signal patterns, in response to a failure of a previously designated control channel, wherein each predetermined signal pattern is transmitted over at least one member of the pool of channels, and wherein the first and second terminals are further configured to assign a channel as the control channel based on exchanging the predetermined signal patterns.

8. The communication system of claim 7 wherein a first one of the predetermined signal patterns is broadcast from the first terminal to the second terminal over at least a subset of members of the pool.

9. The communication system of claim 8 wherein, when a control channel is to be assigned, the second terminal polls at least a subset of the pool members for receipt of the first signal pattern.

10. The communication system of claim 8 wherein, in response to receipt of the first predetermined signal pattern transmitted over a particular member of the pool, the second terminal transmits a second predetermined signal pattern over the particular pool member.

11. The communication system of claim 8, wherein after broadcasting the first signal pattern, the first terminal polls at least a subset of the pool members for receipt of a second predetermined signal pattern.

12. The communication system of claim 11 wherein, in response to receipt of the second predetermined signal pattern transmitted over a particular member of the pool, the first terminal transmits a third predetermined signal pattern over the particular pool member.

* * * * *